(12) United States Patent
Hanada (10) Patent No.: US 8,011,389 B2
(45) Date of Patent: Sep. 6, 2011

(54) MANIFOLD VALVE

(75) Inventor: Toshihiro Hanada, Nobeoka (JP)

(73) Assignee: Asahi Organic Chemicals Industry Co., Ltd., Nobeoka-Shi, Miyazaki (JP)

( * ) Notice: Subject to any disclaimer, the term of this patent is extended or adjusted under 35 U.S.C. 154(b) by 764 days.

(21) Appl. No.: 12/018,985

(22) Filed: Jan. 24, 2008

(65) Prior Publication Data

US 2008/0210323 A1    Sep. 4, 2008

(30) Foreign Application Priority Data

Feb. 2, 2007  (JP) ................................ 2007-023753

(51) Int. Cl.
*F16K 11/22* (2006.01)
(52) U.S. Cl. ................................... 137/637.1
(58) Field of Classification Search ............... 137/637.1, 137/861
See application file for complete search history.

(56) References Cited

U.S. PATENT DOCUMENTS

| | | | | |
|---|---|---|---|---|
| 3,991,788 | A | * | 11/1976 | Kull .............................. 137/863 |
| 4,890,643 | A | * | 1/1990 | Oliver ....................... 137/614.11 |
| 5,615,707 | A | * | 4/1997 | Pfannenschmidt ...... 137/614.06 |
| 6,192,932 | B1 | | 2/2001 | Izumo et al. |
| 7,743,946 | B2 | * | 6/2010 | Edwards et al. ........... 222/129.1 |
| 2003/0155024 | A1 | | 8/2003 | Hanada et al. |

FOREIGN PATENT DOCUMENTS

| | | |
|---|---|---|
| CN | 2225584 Y | 4/1996 |
| CN | 1463342 A | 12/2003 |
| JP | 43-7736 | 4/1968 |
| JP | 52-42969 | 9/1977 |
| JP | 7-332535 A | 12/1995 |

OTHER PUBLICATIONS

English translation of Chinese Office Action issued by the Chinese Patent Office in Chinese Patent Application No. 2008 10009413.0.
Chinese Patent Certificate issued Mar. 30, 2011 by the Chinese Patent Office in corresponding Chinese Application No. 200810009413.0.

\* cited by examiner

*Primary Examiner* — John Fox
(74) *Attorney, Agent, or Firm* — Buchanan Ingersoll & Rooney PC (57) ABSTRACT

A manifold valve having two valves, which enables operation of one valve while disables operation of the other valve, is compact, and facilitates installation in and detachment from a pipeline, that is, a manifold valve provided with a main passageway, a branch passageway split off from the main passageway, a main passageway valve opening and closing the main passageway, and a branch valve opening and closing the branch passageway, the main passageway, the branch passageway, the main passageway valve, and the branch valve being integrally formed, wherein the main passageway valve and the branch valve are each a manual valve having a valve element, a stem connected to the valve element, and an operating lever connected to the stem, the operating lever pivoting in an axial direction of the stem to open and close the passageway, the main passageway valve and the branch valve each converting pivoting motion of the operating lever to linear motion of the valve element and pressing the valve element against and separating it from a valve seat to open and close the passageway, an interlock mechanism further provided wherein when one valve between the main passageway valve and the branch valve is in an open state and the other valve is in a closed state, the operating lever of the one valve disables pivoting motion of the operating lever of the other valve.

6 Claims, 12 Drawing Sheets

Fig. 13

MANIFOLD VALVE

BACKGROUND OF THE INVENTION

1. Field of the Invention

The present invention relates to a manifold valve used for switching passageways of a pipeline in the chemical plant, semiconductor production, foodmaking, biotech, and other various industrial fields, more particularly related to a manifold valve which enables operation of one valve while disables operation of another valve, is compact, and facilitates installation in and detachment from a pipeline.

2. Description of the Related Art

Figure 12:
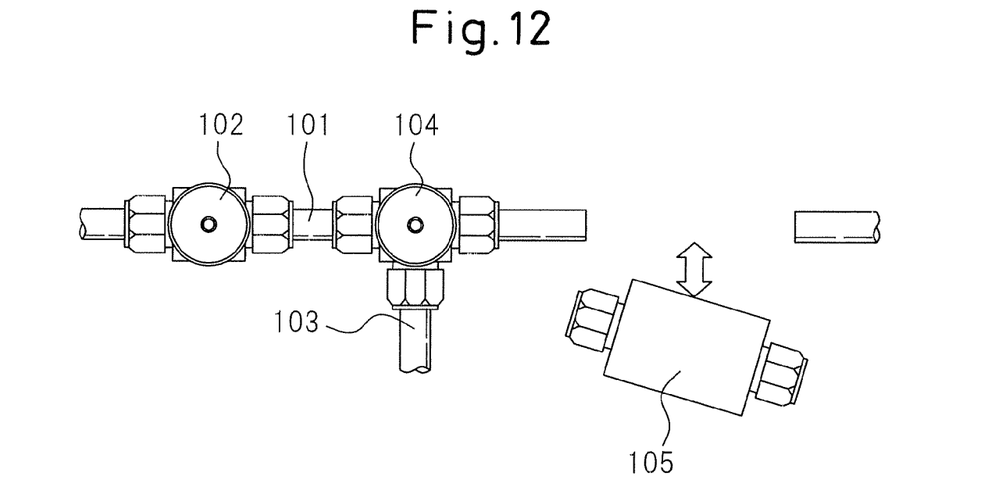
FIG. 12 is a schematic view of a pipeline for conventional semiconductor production.

In the past, in pipelines for semiconductor production, there has been a pipe configuration as shown in FIG. 12 comprised of a main passageway valve 102 for passing and cutting off fluid flowing through a main passageway 101 and a branch valve 104 for opening/closing a branch passageway 103 split off from the main passageway 101. When stopping the flow in the main passageway 101 to replace a part 105 of the pipeline etc., the fluid remaining in the pipeline has been drained outside from the branch passageway 103 so as to enable the part to be replaced without the fluid splattering to the surroundings.

However, in the conventional pipe configuration, when opening the main passageway valve 102 to run fluid through the main passageway 101, the branch valve 104 has to be closed, while when opening the branch valve 104 to run fluid to the branch passageway 103, the main passageway valve 102 has to be closed, but the handles of the valves 102 and 104 were liable to be mistakenly operated. For example, if the fluid were a corrosive fluid and the main passageway valve 102 were closed to replace the part 105 of the pipeline, if mistakenly opening the main passageway valve 102, the fluid flowing through the main passageway 101 would end up splattering to the outside and the worker replacing the part would be liable to be splattered by the corrosive fluid and injured or the splattered fluid would be liable to contaminate or corrode the surroundings of the pipeline and have other detrimental effects.

Figure 13:
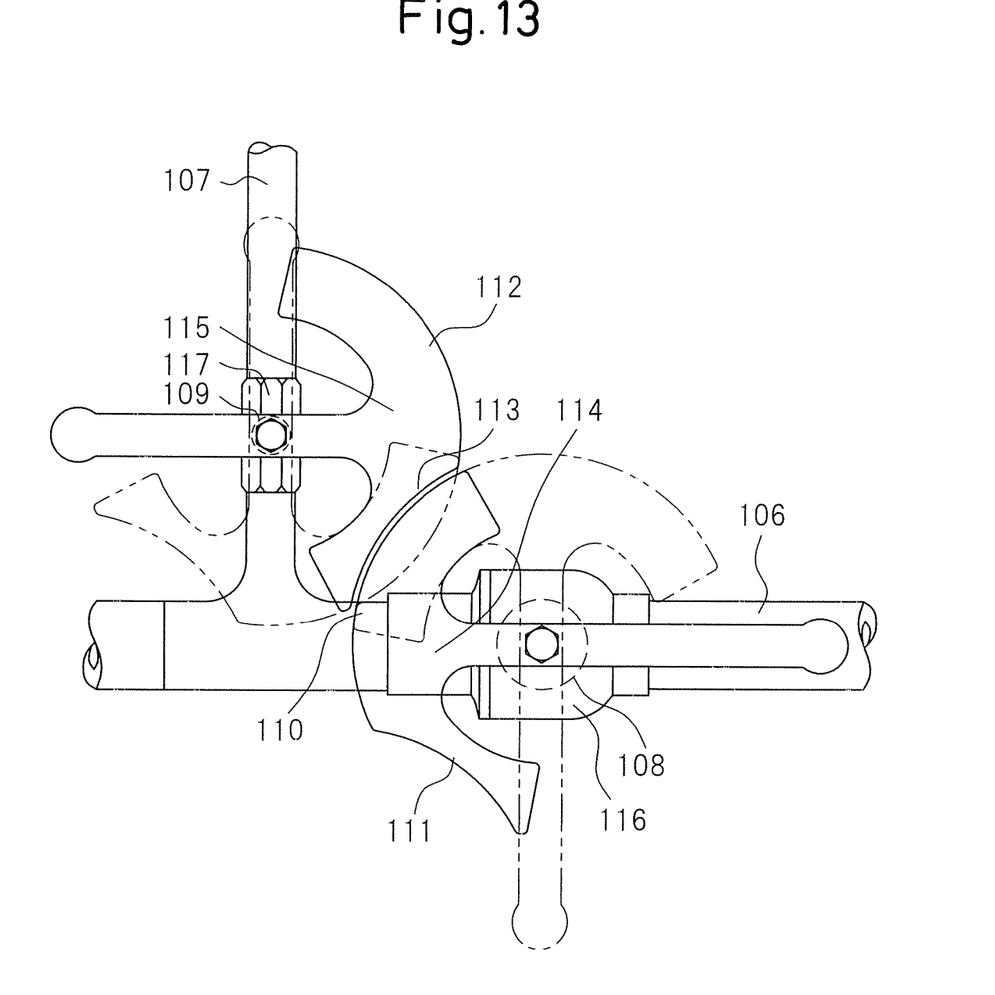
FIG. 13 is a front view of an opening/closing operation system of a valve.

To solve this problem, a configuration is necessary in which when one valve is operated, another valve can be disabled. As a method for this, there was the opening/closing operation system of a valve as shown in FIG. 13 described in Japanese Patent Publication (A) No. 7-332535. In this configuration, a first pipeline 106 and a second pipeline 107 transporting fluids with different properties are separately provided with a first valve 116 having a first valve element 108 and a second valve 117 having a second valve element 109 angularly displacing about axial lines vertical to the axes of the pipelines 106 and 107 to open and close the passageways of the pipelines 106 and 107. The pipelines 106 and 107 have connected to them a first limiting member 114 and a second limiting member 115 having projecting parts 110 and 112 and recessed parts 111 and 113 in the planes vertical to the axes. The recessed part 111 of one of any two adjoining limiting members 114 and 115 was formed retracted from the path of the projecting part 112 of the other in the angular displacement direction, the recessed part 113 of the other was formed retracted from the path of the projecting part 110 of the one in the angular displacement direction, and the projecting parts 110, 112 of the one and other were formed projecting out into the paths in the angular displacement directions. The effect is that in two pipelines separately transporting fluids of different properties, the second limiting member 115 can only be operated to angularly displace in the state where the projecting part 112 of the second limiting member 115 is fit into the recessed part 111 of the first limiting member 114 and the first limiting member 114 can only be operated to angularly displace in the state where the projecting part 110 of the first limiting member 114 is fit into the recessed part 113 of the second limiting member 115. It is only possible to make the limiting members 114 and 115 with projecting parts 110 and 112 fit into the recessed parts 111 and 113 angularly displace, so it is possible to prevent a plurality of valve elements from ending up being simultaneously opened and the limiting members 114 and 115 from being mistakenly operated.

Summarizing the problems to be solved by the invention, in the conventional valve opening/closing operation system, the first limiting member 114 provided at the first valve 116 and the second limiting member 115 provided at the second valve 117 are respectively provided at the first pipeline 106 and the second pipeline 107, so connecting the pipes so that the projecting parts 110 and 112 and the recessed parts 111 and 113 engage requires fine adjustment of the pipe positions. There are therefore the problems that the pipe work is troublesome and time consuming and, when detaching one valve, the other valve gets in the way, so detachment becomes difficult. Further, when used for pipelines in a semiconductor production system etc., there are the problems that the first limiting member 114 and the second limiting member 115 are not suitable for use in cramped spaces since they take up room and that the first valve 116 and the second valve 117 are ball valves or cocks or other rotary valves, so are not suited to applications where particle formation is averred.

SUMMARY OF THE INVENTION

The present invention was made in view of the above problems in the related art and has as its object the provision of a manifold valve which enables operation of one valve while disables operation of another valve, is compact, and facilitates installation in and detachment from a pipeline.

The configuration of the manifold valve of the present invention for achieving the above object will be explained next. The manifold valve of the present invention is provided with a main passageway, a branch passageway split off from the main passageway, a main passageway valve opening and closing the main passageway, and a branch valve opening and closing the branch passageway, the main passageway, the branch passageway, the main passageway valve, and the branch valve being integrally formed, wherein the main passageway valve and the branch valve are each a manual valve having a valve element, a stem connected to the valve element, and an operating lever connected to the stem, the operating lever pivoting in an axial direction of the stem to open and close the passageway, the main passageway valve and the branch valve each converting pivoting motion of the operating lever to linear motion of the valve element and pressing the valve element against and separating it from a valve seat to open and close the passageway, an interlock mechanism further provided wherein when one valve between the main passageway valve and the branch valve is in an open state and the other valve is in a closed state, the operating lever of the one valve disables pivoting motion of the operating lever of the other valve.

The manifold valve is preferably further provided with a trunk passageway, the main passageway being split off from the trunk passageway.

Further, preferably, in the interlock mechanism, the operating lever has a first abutting face abutting against a top surface of a bonnet surrounding the valve when the valve is in a closed state, a second abutting face abutting against the top surface of the bonnet when the valve is in an open state, and a limiting face substantially parallel to the first abutting face, and when the one valve is in a closed state and the other valve is in an open state, the second abutting face of the operating lever of the closed state valve and a limiting face of the operating lever of the open state valve abut against each other or have a clearance.

More preferably, the stem passes through the bonnet to become exposed and has a stem hole passing through its exposed end, the operating lever has a pivot shaft inserted into the stem hole and pivots about the pivot shaft, and a shortest distance from the center of the pivot shaft to the second abutting face is longer than a shortest distance from the center of the pivot shaft to the first abutting face. Preferably, one of the main passageway valve and the branch valve is a diaphragm valve.

The present invention gives the following superior effects due to the above structure.

(1) One valve can be made operable while the other valve can be disabled, so mistaken operation of the manifold valve can be prevented.

(2) The main passageway valve and the branch valve are integrally provided by a manifold valve structure, so connection to and detachment from a pipeline are easy. Furthermore, an interlock mechanism is provided at the manifold valve, so at the time of pipe work, there is no need for fine adjustment of the pipe position.

(3) The valve is formed compact, so use in cramped locations where the pipelines are densely packed becomes possible and the device can be provided small in a pipe in a facility.

(4) Aside for the parts required for the manifold valve, there is no need for addition of other parts for forming the interlock mechanism. The minimum extent of parts is enough to form the interlock mechanism, so assembly of the valve is easy and the production costs can be kept low.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
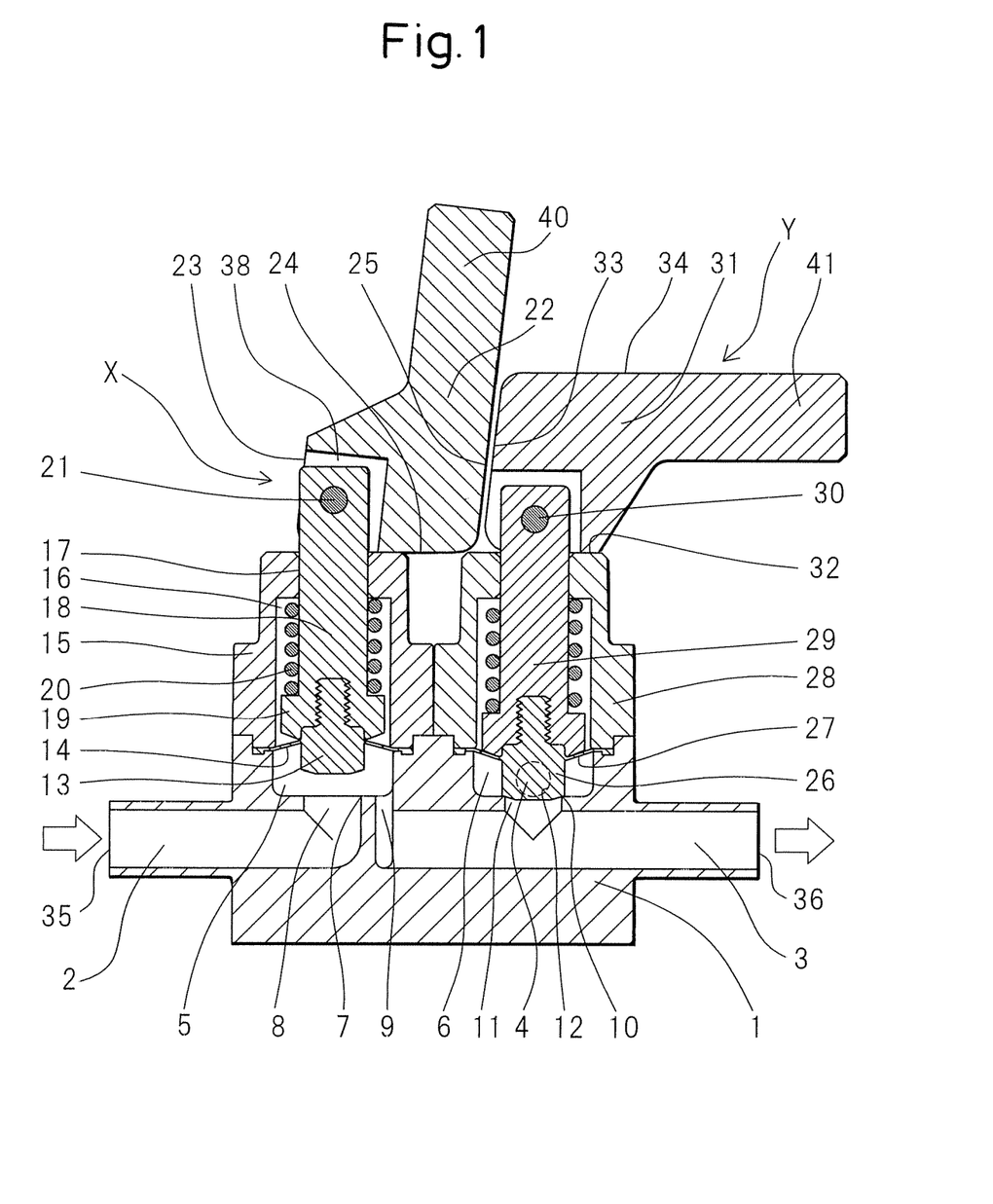
FIG. 1 is a cross-sectional view showing a manifold valve of a first embodiment of the present invention with a main passageway valve in the open state and a branch valve in the closed state.
Figure 2:
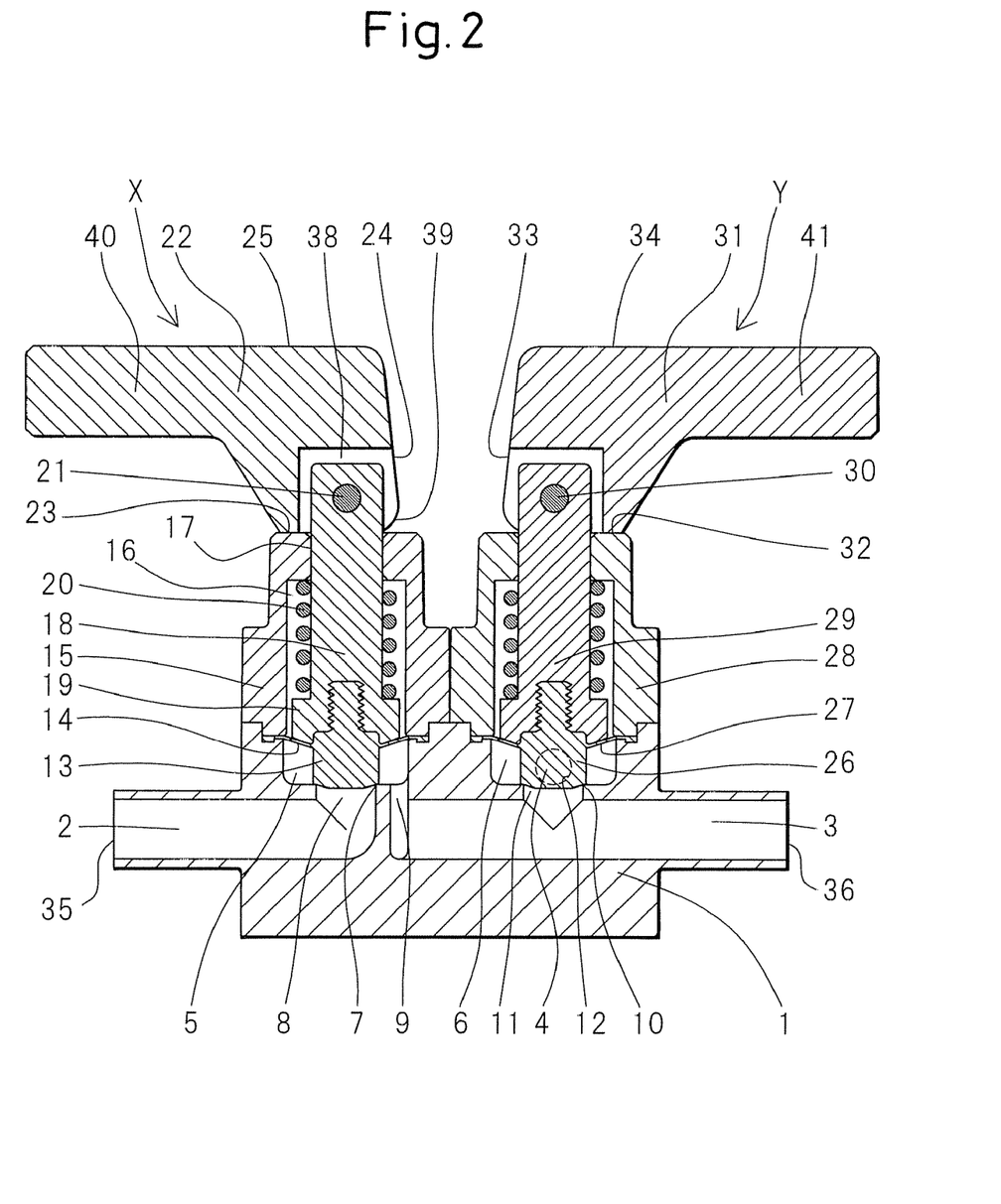
FIG. 2 is a vertical cross-sectional view of a manifold valve of FIG. 1 with a main passageway valve in the closed state and a branch valve in the closed state.
Figure 3:
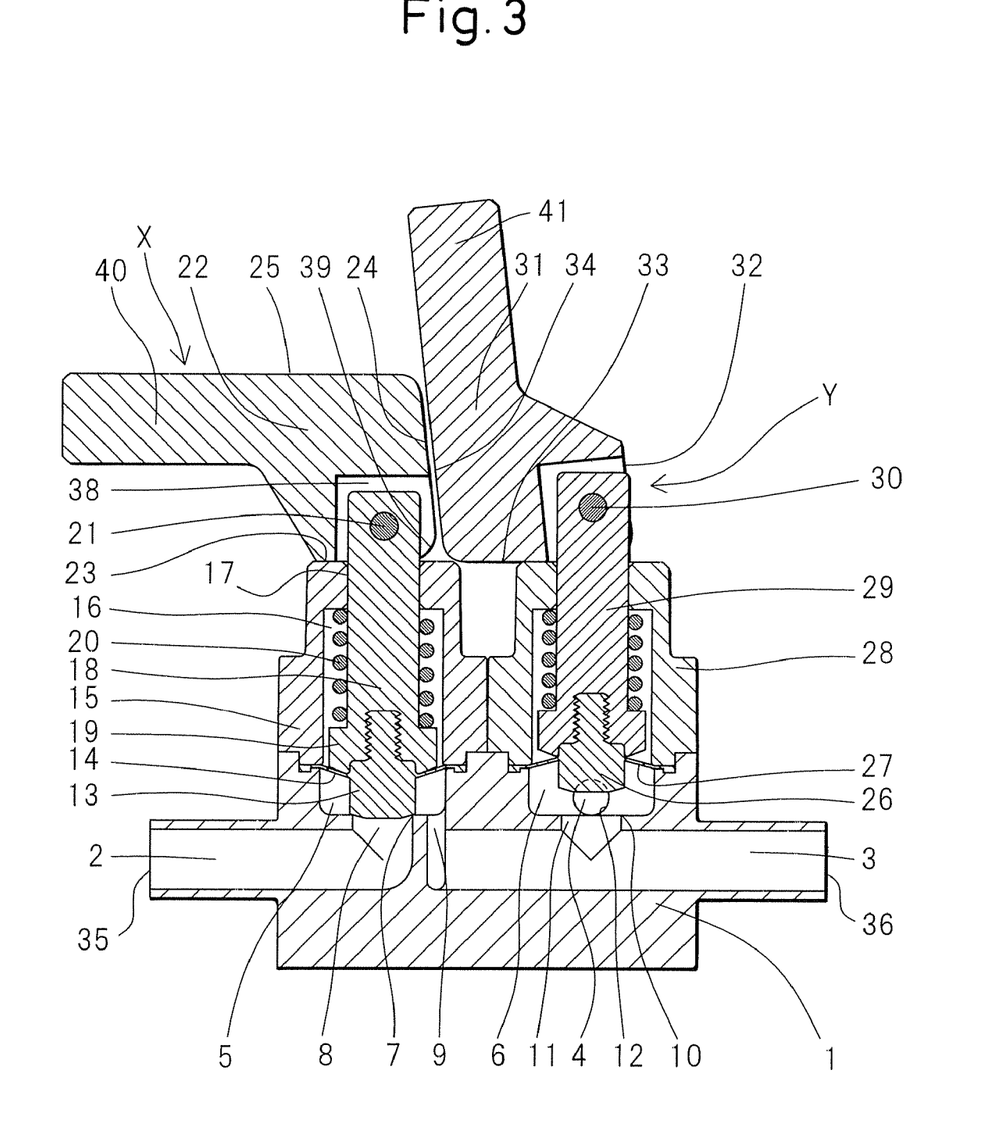
FIG. 3 is a vertical cross-sectional view of a manifold valve of FIG. 1 with a main passageway valve in the closed state and a branch valve in the open state.
Figure 4:
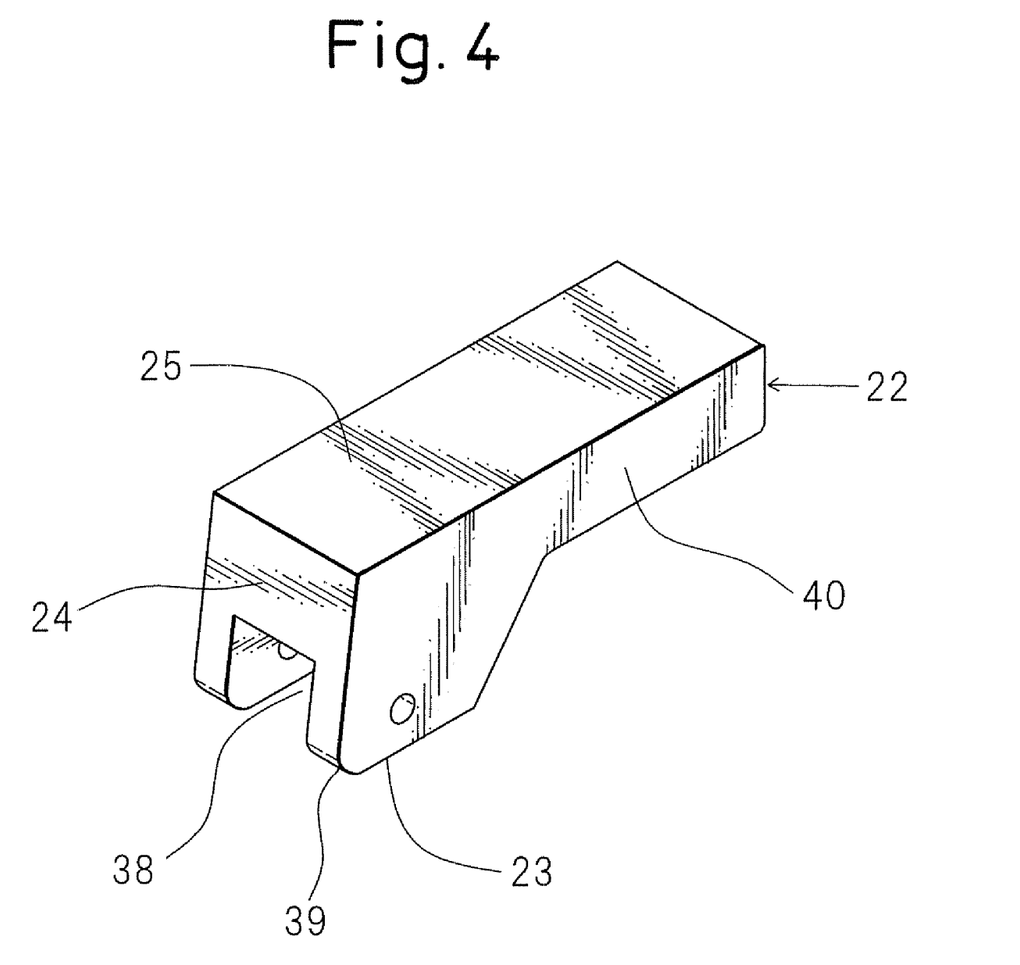
FIG. 4 is a perspective view of the operating lever of FIG. 1.
Figure 5:
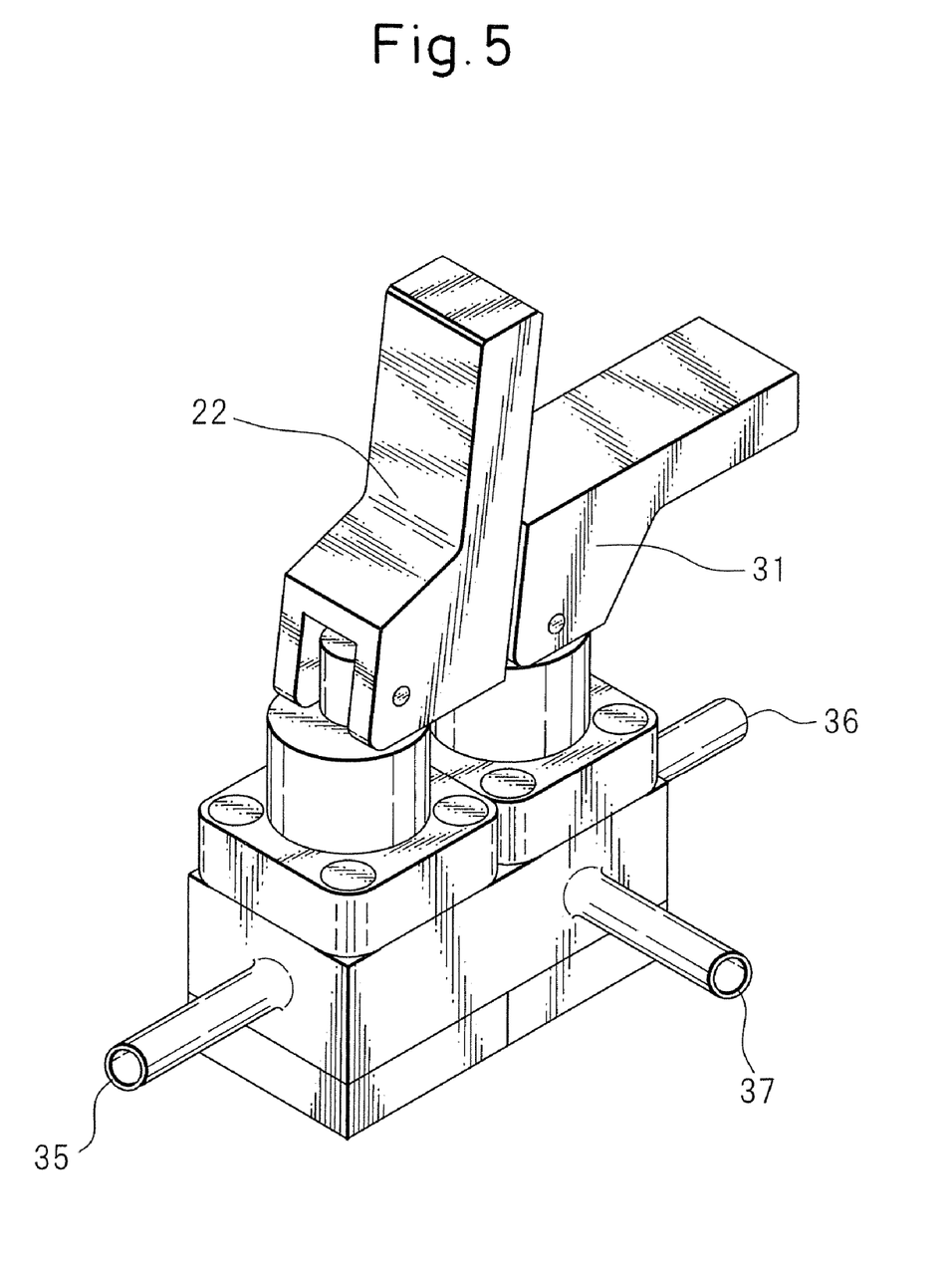
FIG. 5 is a perspective view of FIG. 1.
Figure 6:
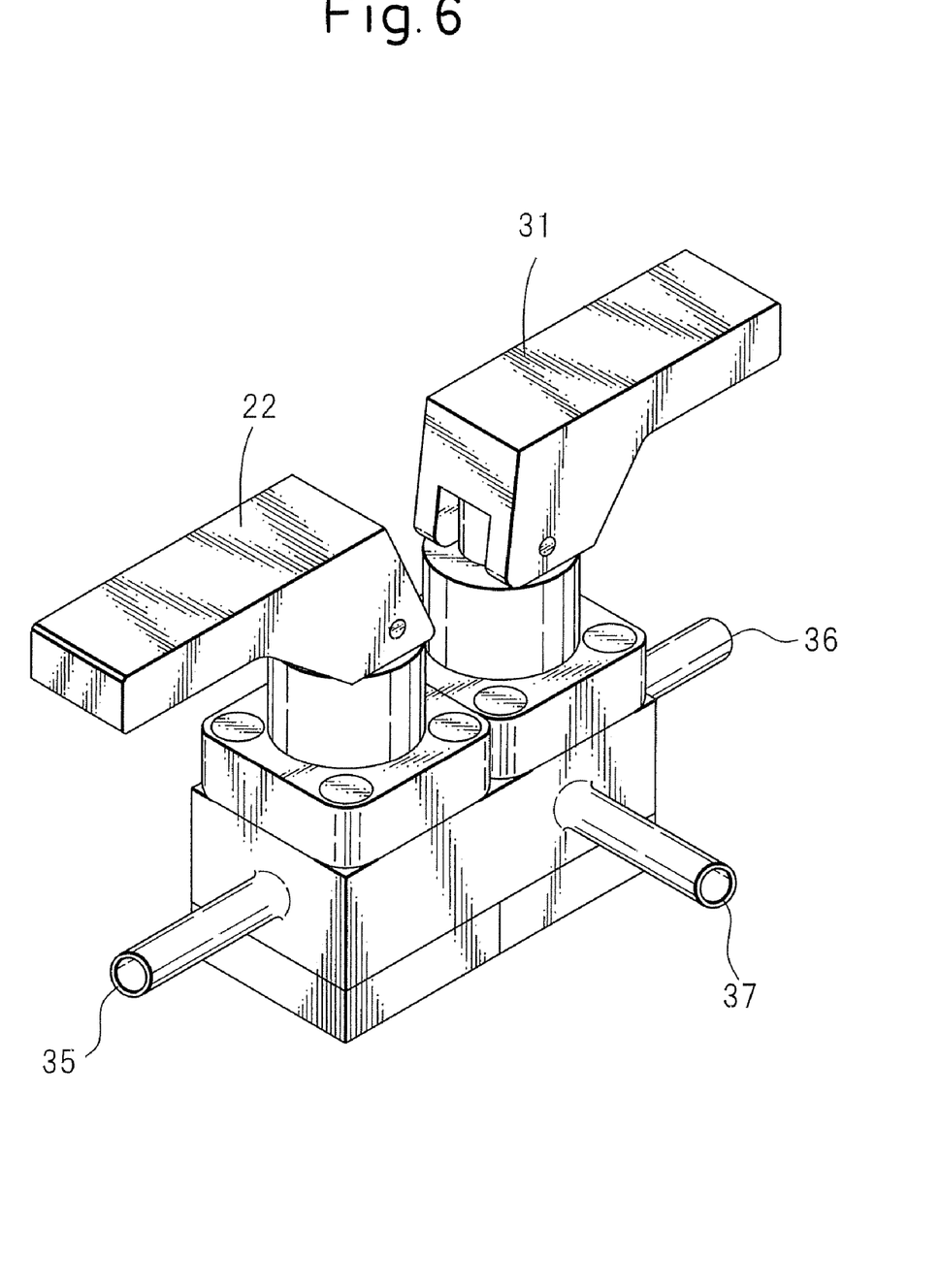
FIG. 6 is a perspective view of FIG. 2.
Figure 7:
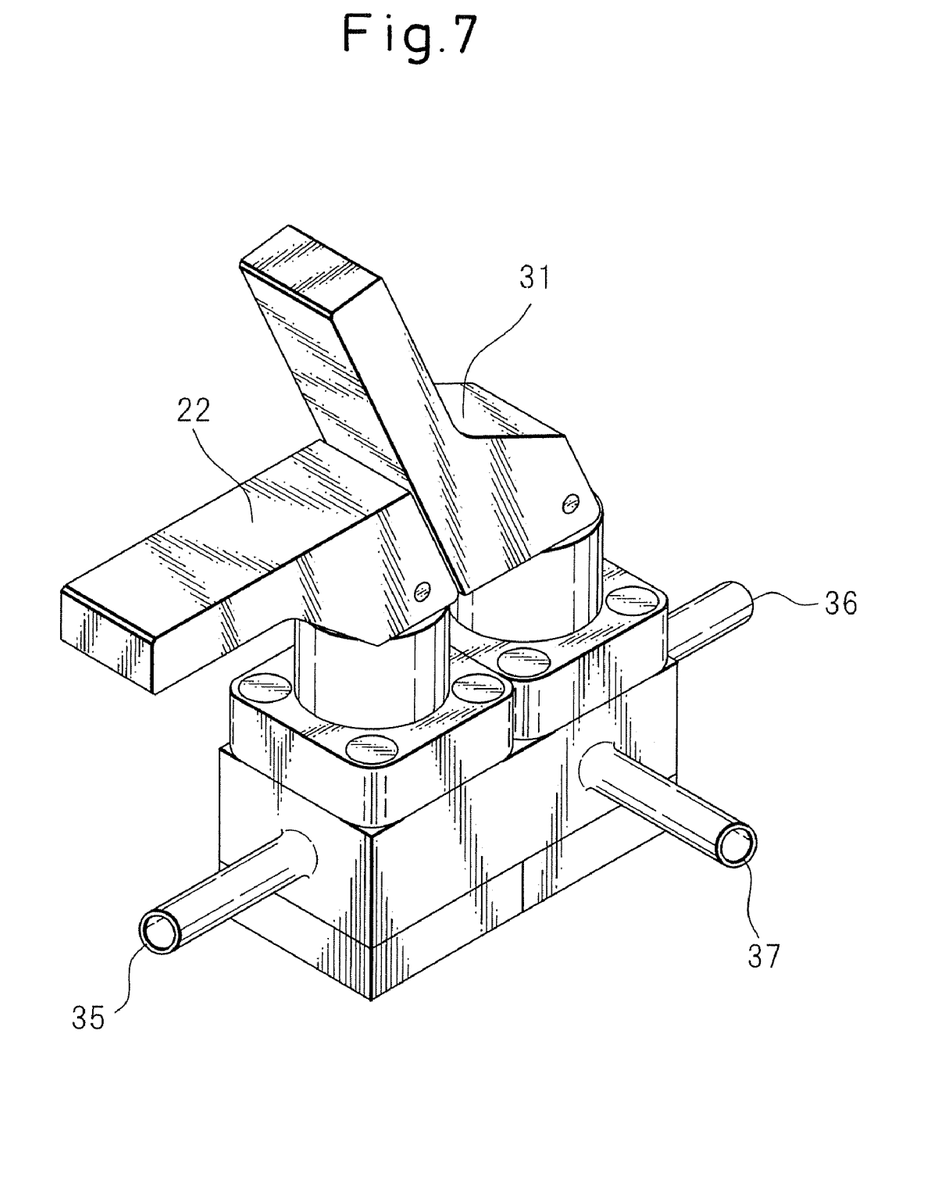
FIG. 7 is a perspective view of FIG. 3.
Figure 8:
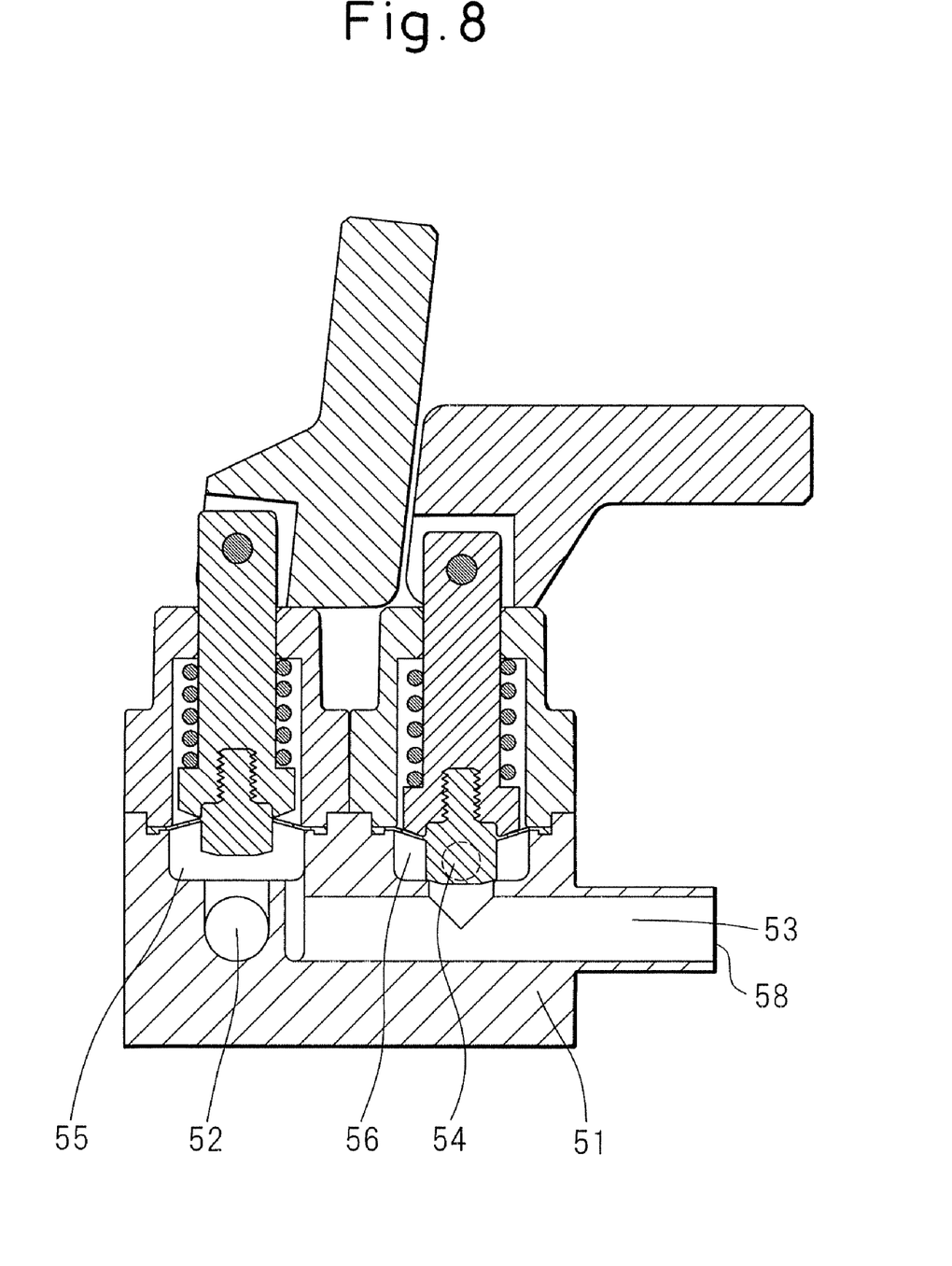
FIG. 8 is a vertical cross-sectional view of a second embodiment of the present invention.
Figure 9:
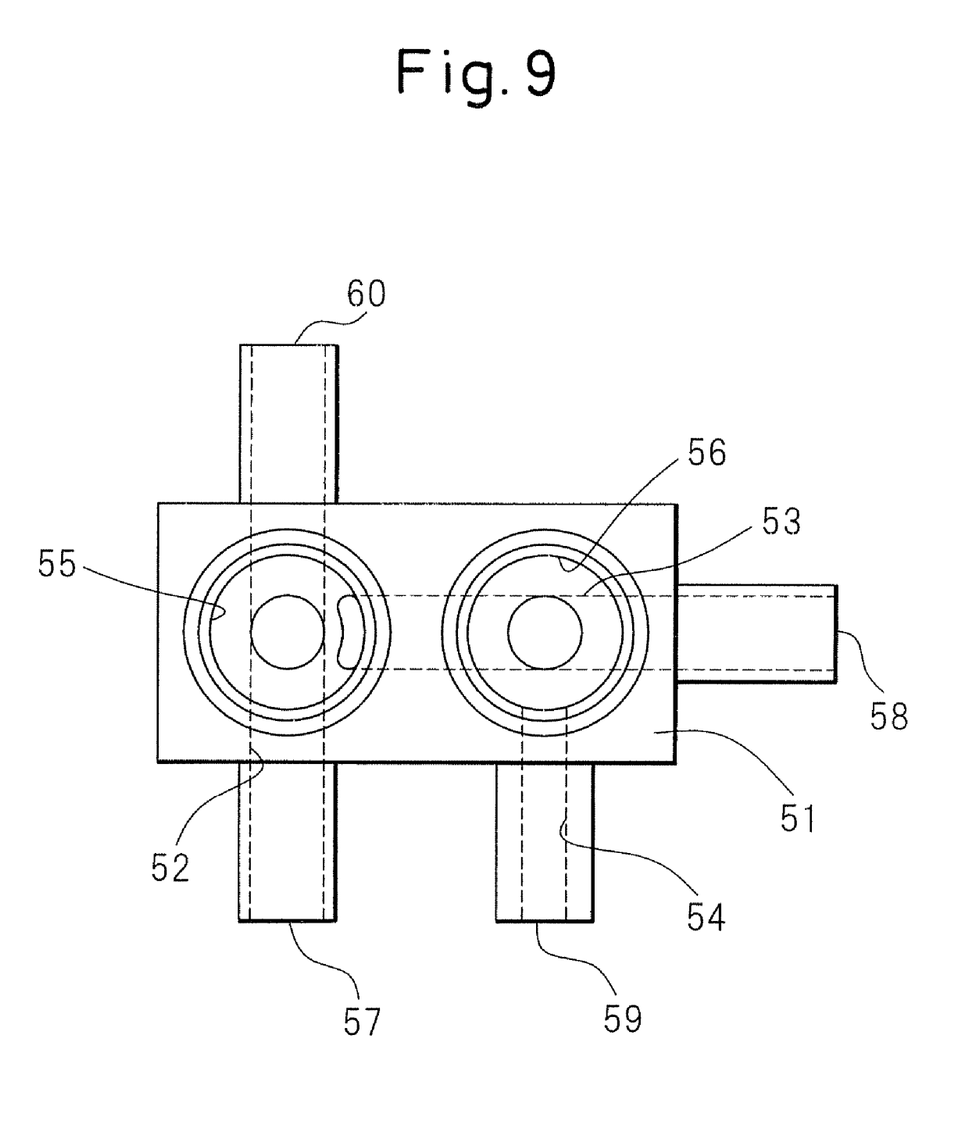
FIG. 9 is a plan view of the main body of FIG. 8.
Figure 10:
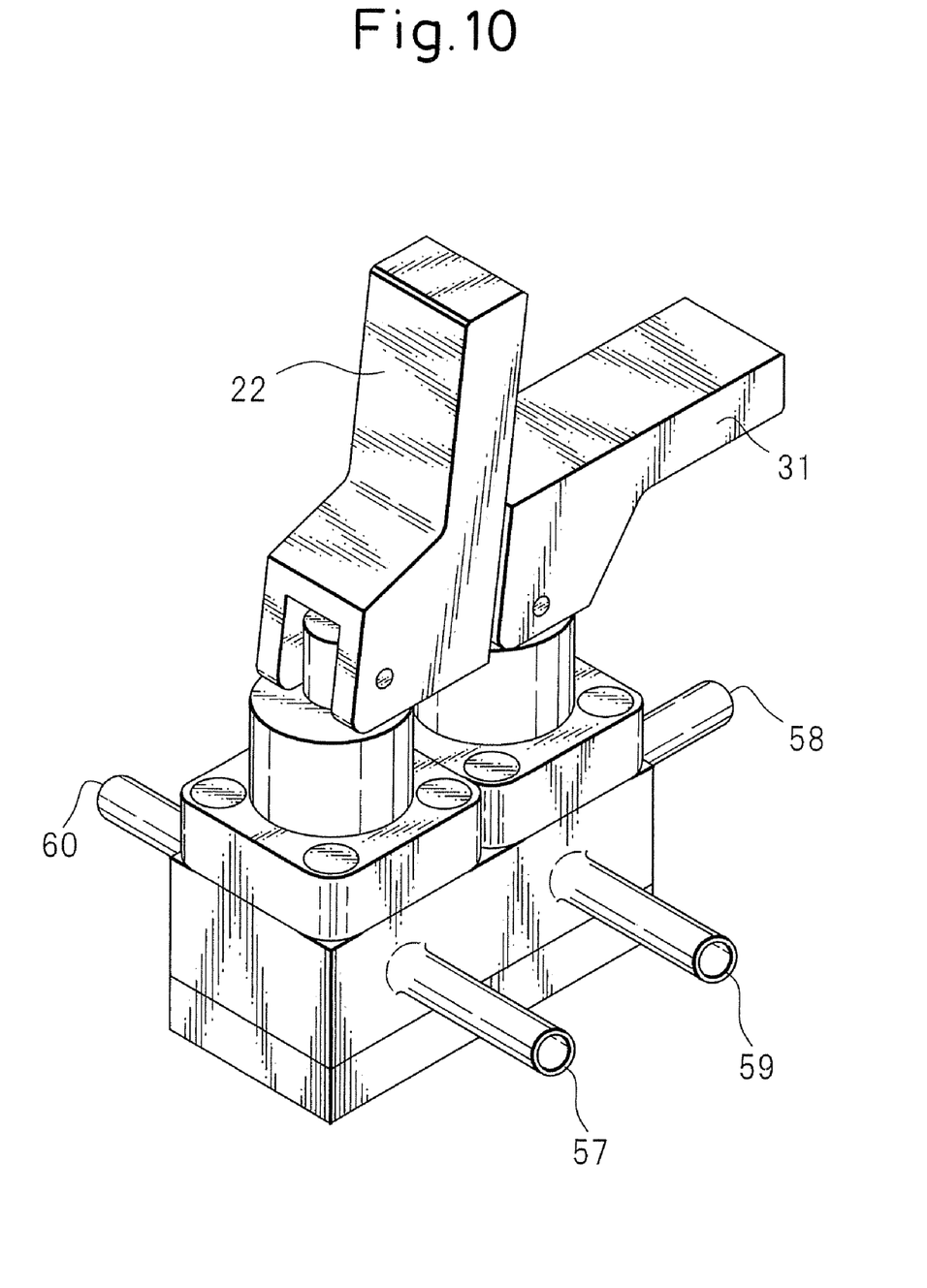
FIG. 10 is a perspective view of FIG. 9.
Figure 11:
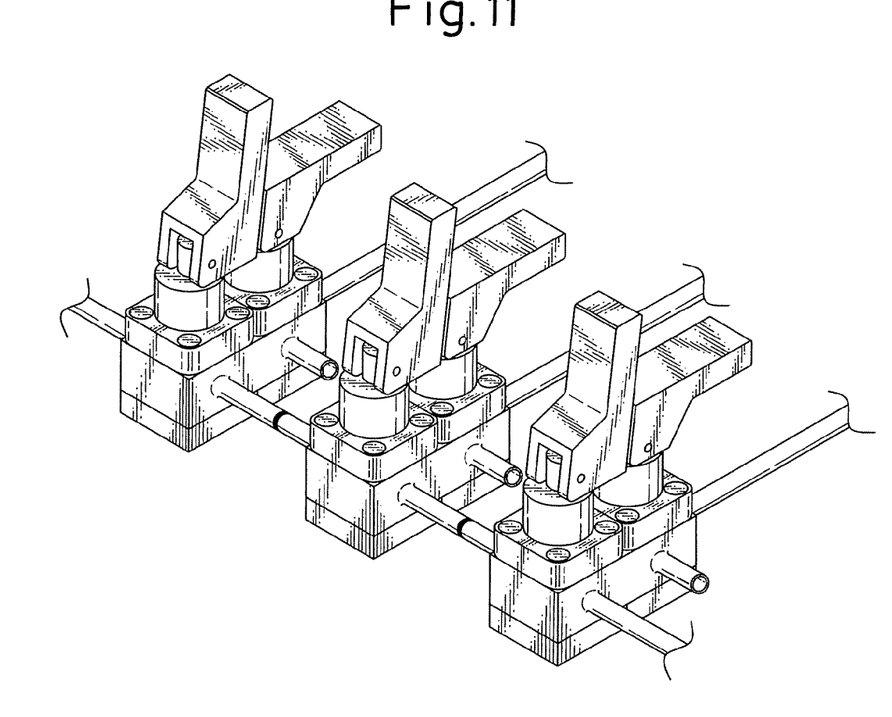
FIG. 11 is a schematic view of a pipeline using the second embodiment of the present invention.

Below, embodiments of the present invention will be explained with reference to the attached drawings, but the present invention is not limited to these embodiments needless to say. FIG. 1 is a cross-sectional view showing a manifold valve of a first embodiment of the present invention with a main passageway valve in the open state and a branch valve in the closed state; FIG. 2 is a vertical cross-sectional view of a manifold valve of FIG. 1 with a main passageway valve in the closed state and a branch valve in the closed state; FIG. 3 is a vertical cross-sectional view of a manifold valve of FIG. 1 with a main passageway valve in the closed state and a branch valve in the open state; FIG. 4 is a perspective view of the operating lever of FIG. 1; FIG. 5 is a perspective view of FIG. 1; FIG. 6 is a perspective view of FIG. 2; FIG. 7 is a perspective view of FIG. 3; FIG. 8 is a vertical cross-sectional view of a second embodiment of the present invention; FIG. 9 is a plan view of the main body of FIG. 8; FIG. 10 is a perspective view of FIG. 9; and FIG. 11 is a schematic view of a pipeline using the second embodiment of the present invention.

In FIG. 1 and FIG. 4, X is a main passageway valve, and Y is a branch valve. 1 indicates the main body. This has a first passageway 2 communicating with a first port 35 at the side face, a second passageway 3 communicating with a second port 36, and a third passageway 3 communicated with a third port 37. Above, a main passageway valve chamber 5 and a branch valve chamber 6 are provided. At the center of the bottom surface of the main passageway valve chamber 5, a valve seat 7 is formed, at the center of the valve seat 7, a first opening 8 communicating with the first passageway 2 is provided, while at the peripheral edge of the bottom surface, a second opening 9 communicating with the second passageway 3 is provided. At the center of the bottom surface of the branch valve chamber 6, a valve seat 10 is formed, at the center of the valve seat 10, a third opening 11 communicating with the second passageway 3 is provided, while at the side surface of the branch valve chamber 6, a fourth opening 12 communicating with the third passageway 4 is provided. Note that at the bottom of the main body 1, a stand for stably setting the manifold valve may also be provided.

At that time, the passageway extending from the first passageway 2 through the first opening 8, main passageway valve chamber 5, and second opening 9 to the second passageway 3 becomes the main passageway, while the passageway extending from the third opening 11 through the branch valve chamber 6 and fourth opening 12 to the third passageway 4 becomes the branch passageway. The main body 1 is formed so that the main passageway valve X opening and closing the main passageway at the main passageway valve chamber 5 side and the branch valve Y opening and closing the branch passageway a the branch valve chamber 6 side are integrally formed.

First, the configuration of the main passageway valve X will be explained. Reference numeral 13 is a valve element arranged inside the main passageway valve chamber 5. Around the valve element 13, a diaphragm 14 extending in the radial direction is integrally formed. The peripheral edge of the diaphragm 14 is fastened by being clamped between the main body 1 and a later explained bonnet 15. The valve element 13 is pushed against and separated from the valve seat 7, whereby the flow of fluid of the second passageway 3 from the first passageway 2, that is, the main passageway, is shut or opened.

Reference numeral 15 is a bonnet. At the bottom of the bonnet, a recess 16 is provided opening at the bottom surface. At the top, a through hole 17 communicating with the recess 16 is provided. The bottom surface is fastened abutting against the main body 1.

Reference numeral 18 is a stem. In the state with its top sticking out from the through hole 17 of the bonnet 15 and the state able to move vertically but unable to rotate, it is inserted into the recess 16 of the bonnet 15. At the bottom end of the stem 18, the valve element 13 is screwed in. By clamping a spring 20 between the top surface of a flange 19 provided at the bottom and the ceiling of the recess 16 of the bonnet 15, the valve element 13 is biased downward.

Reference numeral 22 is an operating lever. It has a first abutting face 23 at its bottom surface when the main passageway valve X of FIG. 2 is in the closed state, a second abutting face 24 at one side face having an angle formed with the first abutting face 23 of 85°, and a limiting face 25 at its top surface substantially parallel to the first abutting face 23. The intersecting part of the first abutting face 23 and the second abutting face 24 is a smooth connection by an arc shaped surface 39. Further, it is provided with a handle 40 extending to the opposite side of the second abutting face 24. The operating lever 22 is formed with a rectangular cutaway part 38 straddling the first abutting face 23 and second abutting face 24. In the cutaway part 38, the top of the stem 18 is inserted. An engagement pin 21 is inserted through a through hole provided in a side face of the operating lever 22 (face perpendicular to second abutting face 24) and a through hole provided at the top of the stem 18 (stem hole), whereby the parts are joined together. Note that the engagement pin 21 is used as a pivot shaft and the operating lever 22 pivots about the pivot shaft (engagement pin 21). The engagement pin 21 is provided to be parallel with the engagement pin 30 provided at the later explained operating lever 31. The shortest distance from the center of the pivot shaft (engagement pin 21) to the second abutting face 24 is formed so as to become longer than the shortest distance from the center of the pivot shaft (engagement pin 21) to the first abutting face 23. This difference in distances becomes the lift of the valve.

Next, the configuration of the branch valve Y will be explained. Reference numeral 26 is a valve element arranged inside the branch valve chamber 6. Around the valve element 26, a diaphragm 27 extending in the radial direction is integrally formed. The peripheral edge of the diaphragm 27 is fastened by being clamped between the main body 1 and a later explained bonnet 28. The valve element 26 is pushed against and separated from the valve seat 10, whereby the flow of fluid of the third passageway 4 from the second passageway 3, that is, the connection between the main passageway and the branch passageway, is shut or opened.

Reference numeral 28 is a bonnet, 29 a stem, and 31 an operating lever. The operating lever 31 is configured similar to the operating lever 22 and is provided with a first abutting face 32, a second abutting face 33, a limiting face 34, and a handle 41. The parts of the branch valve are similar to the parts of the main passageway valve, so explanations will be omitted.

Here, the configurations of the operating lever 22 and operating lever 31 will be explained. The operating lever 22 and operating lever 31 are attached so that when the two valves are in the closed state, the respective second abutting faces 24, 33 face each other (see FIG. 2). When the main passageway valve X is in the open state and the branch valve Y is in the closed state, the limiting face 25 of the operating lever 22 is provided parallel to the second abutting face 33 of the operating lever 31 with a slight clearance (see FIG. 1). When the main passageway valve X is in the closed state and the branch valve Y is in the open state, the limiting face 34 of the operating lever 31 is provided to be parallel with the second abutting face 24 of the operating lever 22 while forming a slight clearance (see FIG. 3). Note that the limiting face 25 and second abutting face 33 and the limiting face 34 and second abutting face 24 may be provided so as to abut against each other without providing any clearance.

Next, the operation of the first embodiment of the present invention will be explained.

First, explaining the operation of the main passageway valve X, in the state where the first abutting face 23 of the operating lever 22 and the top surface of the bonnet 15 abut against each other (state where handle 40 of operating lever 22 faces horizontal direction), due to the springback force of the spring 20, the valve element 13 is pressed against the valve seat 10, the main passageway valve X becomes the closed state, and the flow of fluid is cut off (state of FIG. 2 and FIG. 3). Next, when the operating lever 22 pivots about the pivot shaft and the handle 40 is raised up (made state where handle 40 faces vertical direction), the first abutting face 23 and the top surface of the bonnet 15 separate, the surface contacting the top surface of the bonnet 15 moves along the arc shaped surface 39, and the second abutting face 24 and the top surface of the bonnet abut against each other. At that time, the distance from the pivot shaft of the operating lever 22 is greater at the second abutting face 24 than the first abutting face 23, so the greater the difference in this distance, the more the position of the pivot shaft of the operating lever 22 moves from the top surface of the bonnet 15 upward. Therefore, the stem 18 engaged with the operating lever 22 by the pivot shaft, that is, the engagement pin 21, also rises while compressing the spring 20, the valve element 13 connected to the front end of the stem 18 also rises and separates from the valve seat 7, the main passageway valve X becomes the open state, and the fluid flowing in from the first passageway 2 flows to the second passageway 3 (state of FIG. 1).

On the other hand, if pivoting the operating lever 22 about the pivot shaft from this state (state of FIG. 1) to lower the handle 40 (place the handle 40 of the operating lever 22 in a state in the horizontal direction), the second abutting face 24 and the top surface of the bonnet 15 will separate and instead the first abutting face 23 and the top surface of the bonnet 15 will abut against each other and the distance from the pivot shaft of the operating lever 22 to the top surface of the bonnet 15 will become closer, so the greater the difference in this distance, the more the stem 18 engaged with the operating lever 22 by the pivot shaft will descend. At that time, due to the biasing force of the spring 20, the valve element 13 is pressed against the valve seat 7, the main passageway valve X becomes the closed state, and the flow of fluid is cut off (state of FIG. 2 and FIG. 3).

The branch valve Y is the same as the main passageway valve X in structure, so the explanation of its operation will be omitted, but when the branch valve Y is in the closed state, the flow of fluid from the second passageway 3 to the third passageway 4 is cut off, while when the branch valve Y is in the open state, the fluid flows from the second passageway 3 to the third passageway 4.

Next, the interlock mechanism of the manifold valve of the present invention will be explained.

First, when the main passageway valve X is in the open state and the branch valve Y is in the closed state (state of FIG. 1), the fluid flowing in from the first passageway 2 flows out from the second passageway 3. At that time, the handle 40 of the operating lever 22 of the main passageway valve X is in the state raised up and is positioned substantially parallel with the limiting face 25 of the main passageway valve X and the second abutting face 33 of the branch valve Y with a slight clearance. In this state, even if trying to raise up the handle 41 of the operating lever 31 of the branch valve Y, the second abutting face 33 of the branch valve Y will abut against the limiting face 25 of the main passageway valve X and the handle 41 of the operating lever 31 will not be able to be raised up. Due to this interference between operating levers, with the branch valve Y in the closed state, the operating lever 31 will not be able to be operated and the open state is prevented. On the other hand, even if the operating lever 22 of the main passageway valve X is operated, the operating levers will not interfere with each other and it is possible to freely switch from the open state to the closed state. That is, in this state, the main passageway valve X can be operated to open or close, but the branch valve cannot be operated.

Next, when the main passageway valve X is in the closed state and the branch valve Y is in the open state (state of FIG. 3), fluid flows from the second passageway 3 to the third passageway 4. At that time, the handle 41 of the operating lever 31 of the branch valve Y is in the state raised up and the second abutting face 2 of the main passageway valve X and the limiting face 34 of the branch valve Y are positioned substantially parallel with a slight clearance. In this state, even if trying to raise the handle 40 of the operating lever 22 of the main passageway valve X, the second abutting face 24 of the main passageway valve X will abut against the limiting face 34 of the branch valve Y and the handle 40 of the operating lever 22 will not be able to be raised. Due to this interference between operating levers, when the main passageway valve X is in the closed state, the operating lever 22 cannot be operated and is prevented from being set to the open state. On the other hand, even if the operating lever 31 of the branch valve Y is operated, the operating levers will not interfere with each other and the open state can be freely switched to the closed state. That is, in this state, the branch valve Y can be operated to open/close, but the main passageway valve X cannot be operated.

Next, even when the two valves are in the closed state (state of FIG. 2), the handles 40 and 41 of the operating levers 22 and 31 face in opposite directions and the limiting faces 25 and 34 face in the upward direction, so each valve can be operated. However, when one valve is operated, the other valve can no longer be operated because the operating levers interfere, so the two valves cannot be simultaneously operated.

As explained above, the manifold valve of the present invention is structured so that the two valves cannot be simultaneously set to the open state. When using this manifold valve for the pipeline of the semiconductor production system as shown in FIG. 12, the main passageway valve 102 and the branch valve 103 can be provided by just the single manifold valve of the present invention (not shown), Furthermore, since an interlock mechanism is provided in the manifold valve structure, there is no need for fine adjustment of the pipe position for installing the interlock mechanism. Therefore, pipe connection becomes easy. Further, since the structure is compact, the cramped space inside a pipeline can be used and the semiconductor production system can be formed smaller. Further, when replacing a pipeline part, the main passageway valve X is set in the closed state to stop the flow in the main passageway and the branch valve Y is set in the open state to cause the fluid remaining in the main passageway to flow outside from the branch passageway. When performing the work for replacing the part, due to the interlock mechanism, the main passageway valve X can be prevented from mistakenly becoming the open state, so the worker can safely replace the part without fluid splattering to the surroundings.

Note that in this embodiment, the inflowing fluid is used as a flow passing through the first passageway 2 and flowing out from the second passageway 3 and a flow flowing out from the second passageway 3 to the third passageway 4, but depending on the application of the manifold valve, the fluid may be made to flow in any way.

Next, a second embodiment of the present invention when the main passageway valve is a branch valve structure will be explained.

As shown in FIG. 8 to FIG. 10, the manifold valve of the second embodiment is provided with a first passageway 52 communicating from the first port 57 to the fourth port 60 (in FIG. 8, the passageway running from the front side to the rear side, while the first and fourth ports 57 and 60 open to the two side faces of the main body 51), a second passageway 53 communicating from a predetermined location of the first passageway 52 to the second port 58, and a third passageway 54 communicating from a predetermined location of the second passageway 53 to the third port 59 integrally inside the main body 51. At the top, the main passageway valve chamber 55 and branch valve chamber 56 are respectively provided (see FIG. 9). At that time, the first passageway 52 becomes the trunk passageway, the passageway from the first passageway 52 through the main passageway valve chamber 55 to the second passageway 53 becomes the main passageway, and the passageway from the branch valve chamber 56 to the third passageway 54 becomes the branch passageway. The main passageway becomes a passageway branched from the trunk passageway.

The main body 51 is formed so that the main passageway valve opening/closing the main passageway at the main passageway valve chamber 55 side and the branch valve opening/closing the branch passageway at the branch valve chamber 56 side become integral. The configurations of the main passageway valve and branch valve are similar to those of the first embodiment, so their explanations will be omitted.

Next, the operation of the second embodiment of the present invention will be explained.

The flow of fluid of the manifold valve branches the fluid flowing through the first passageway 52 through the main passageway valve to the second passageway 53. The main passageway valve can open/close the branched passageway. Further, the fluid flowing through the second passageway 53 is branched by the branch valve and flows to the third passageway 54. The branch valve can further open/close the branched passageway. The operations of the main passageway valve and branch valve and the interlock mechanisms are similar to the first embodiment of the present invention, so the explanation will be omitted. If using this manifold valve for the pipeline of a semiconductor production system, as shown in FIG. 11, when connecting a plurality of manifold valves of the present invention in parallel to pipes, while in the past chases or manifold joints etc. were used to branch off the fluid for pipe connection, it is possible to connect the pipes without requiring the manifold joints. The members for connecting the pipes can be reduced and pipe connection therefore becomes easy.

The interlock mechanism of the manifold valve of the present invention need only be configured so that when one valve is in the open state and the other valve is in the closed state, the operating lever of the one valve pivot holds the operating lever of the other valve in a state where it cannot pivot about the pivot shaft. At that time, while holding the operating lever of the other valve in the state disabled so that it cannot pivot about the pivot shaft, the operating lever of the one valve can pivot about the pivot shaft to open/close the one valve.

Further, the operating levers 22 and 31 are shaped having the first abutting faces 23 and 32, second abutting faces 24 and 33, and limiting faces 25 and 34. The shapes are not particularly limited so long as they meet the requirements of the interlock mechanism.

The branch valve and main passageway valve of the present invention are configured so that the operating levers 22 and 31 pivot about the pivot shaft and open/close the valve. It is necessary that at least one of the valves be provided with a converting means for converting the pivoting motion of the operating levers 22 and 31 about the pivot shaft to linear motion of the valve elements 13 and 26 by a toggle mechanism. At that time, the valves may be configured as diaphragm valves, stop valves, poppet valves, sprue valves, etc., but are preferably diaphragm valves since they are superior in leaching characteristics and are easy to configure so as to suppress the generation of particles in the fluid.

In the present invention, the diaphragms 14 and 27 are preferably made of fluororesins. A polytetrafluoroethylene (hereinafter referred to as "PTFE"), polyvinylidene fluoride (hereinafter referred to as "PVDF"), polytetrafluoroethylene-perfluoroalkylvinyl ether copolymer (hereinafter referred to as "PFA"), etc. may be mentioned as suitable.

In the present invention, the material of the main body 1, bonnets 15 and 28, stems 18 and 29, and operating levers 22 and 31 of the manifold valve are not particularly limited so long as they have the necessary physical properties as a manifold valve, but PTFE, PVDF, PFA, polychlorotrifluoroethylene, and other fluororesins may be mentioned as suitable ones. Polypropylene, polyvinyl chloride, polystyrene, ABS resin, or other resins, stainless steel and other metals if there is no concern about corrosion by the fluid, etc. are all possible.

The fluid flowing through the manifold valve of the present invention is not particularly limited and may be pure water, hydrochloric acid, sulfuric acid, hydrofluoric acid, ammonia water, hydrogen peroxide, ammonium fluoride, etc.

While the invention has been described with reference to specific embodiments chosen for purpose of illustration, it should be apparent that numerous modifications could be made thereto by those skilled in the art without departing from the basic concept and scope of the invention.

The invention claimed is:

1. A manifold valve comprising a main passageway, a branch passageway split off from said main passageway, a main passageway valve opening and closing said main passageway, and a branch valve opening and closing said branch passageway, said main passageway, said branch passageway, said main passageway valve, and said branch valve being integrally formed, wherein
said main passageway valve and said branch valve are each a manual valve having a valve element, a stem connected to said valve element, and an operating lever connected to said stem, said operating lever pivoting in an axial direction of said stem to open and close the passageway,
said main passageway valve and said branch valve each converting pivoting motion of said operating lever to linear motion of said valve element and pressing said valve element against and separating it from a valve seat to open and close the passageway,
the manifold valve further comprising an interlock mechanism,
wherein when one of said main passageway valve and said branch valve is in an open state and the other is in a closed state, said operating lever of one of said valves valve disables pivoting motion of said operating lever of the other of said valves, and
wherein in said interlock mechanism,
said operating lever has a first abutting face abutting against a top surface of a bonnet surrounding said main passageway valve or said branch valve when said main passageway valve or said branch valve is in a closed state, a second abutting face abutting against the top surface of said bonnet when said main passageway valve or said branch valve is in an open state, and a limiting face substantially parallel to said first abutting face, and
when said one valve is in a closed state and said other valve is in an open state, the second abutting face of said operating lever of said closed state valve and a limiting face of said operating lever of said open state valve abut against each other or have a clearance.

2. A manifold valve as set forth in claim 1, further comprising a trunk passageway, said main passageway being split off from said trunk passageway.

3. A manifold valve as set forth in claim 2, wherein
said stem passes through said bonnet to become exposed and has a stem hole passing through its exposed end,
said operating lever has a pivot shaft inserted into said stem hole and pivots about said pivot shaft,
a shortest distance from the center of said pivot shaft to the second abutting face is longer than a shortest distance from the center of said pivot shaft to the first abutting 4. A manifold valve as set forth in claim 2, wherein one of said main passageway valve and said branch valve is a diaphragm valve.

5. A manifold valve as set forth in claim 1, wherein
said stem passes through said bonnet to become exposed and has a stem hole passing through its exposed end,
said operating lever has a pivot shaft inserted into said stem hole and pivots about said pivot shaft,
a shortest distance from the center of said pivot shaft to the second abutting face is longer than a shortest distance from the center of said pivot shaft to the first abutting face.

6. A manifold valve as set forth in claim 1, wherein one of said main passageway valve and said branch valve is a diaphragm valve.

* * * * *